United States Patent
Lutz

(10) Patent No.: US 12,216,460 B2
(45) Date of Patent: Feb. 4, 2025

(54) METHOD FOR ENGINEERING AND SIMULATING AN AUTOMATION SYSTEM VIA DIGITAL TWINS

(71) Applicant: Siemens Aktiengesellschaft, Munich (DE)

(72) Inventor: Benjamin Lutz, Pfinztal (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 374 days.

(21) Appl. No.: 17/599,100

(22) PCT Filed: Mar. 23, 2020

(86) PCT No.: PCT/EP2020/057945
§ 371 (c)(1),
(2) Date: Sep. 28, 2021

(87) PCT Pub. No.: WO2020/200870
PCT Pub. Date: Oct. 8, 2020

(65) Prior Publication Data
US 2022/0163953 A1 May 26, 2022

(30) Foreign Application Priority Data
Mar. 29, 2019 (DE) .......................... 102019204480.8

(51) Int. Cl.
*G05B 19/418* (2006.01)
(52) U.S. Cl.
CPC ... *G05B 19/41885* (2013.01); *G05B 19/4185* (2013.01); *G05B 19/41865* (2013.01);
(Continued)

(58) Field of Classification Search
CPC ........... G05B 2219/23005; G05B 2219/25011; G05B 2219/25064; G05B 17/02
See application file for complete search history.

(56) References Cited

U.S. PATENT DOCUMENTS 11,237,855 B2 * 2/2022 Kobayashi ......... G05B 19/0426
2016/0274552 A1 * 9/2016 Strohmenger ......... G05B 15/02
(Continued)

FOREIGN PATENT DOCUMENTS

| CN | 107450980 | 12/2017 |
| CN | 107832497 | 3/2018 |

(Continued)

OTHER PUBLICATIONS

Eitner Janis et al; "Industrie 4.0: Virtueller Zwilling steuert die Produktion"; Hannover Messe Preview 2017: Presseinformation; pp. 1-5, Sep. 2, 2017.
(Continued)

*Primary Examiner* — Santosh R Poudel
(74) *Attorney, Agent, or Firm* — Cozen O'Connor

(57) ABSTRACT

A method for engineering an automation system that is usually tested before being put into operation, wherein a "twin" or a virtual component is generated and loaded onto a server for each real component to perform the function of the real components in a simulated manner in place of said real components, such that it is thus possible for a user to replace various real components with virtual components during the engineering process and to check or simulate the function of the automation system, where it becomes possible to perform a synchronous optimization of automation systems or to put automation programs and system displays into operation in a coexistent, safe, flexible, and incremental manner.

12 Claims, 3 Drawing Sheets

(52) U.S. Cl.
CPC .............. *G05B 2219/23005* (2013.01); *G05B 2219/25011* (2013.01); *G05B 2219/25064* (2013.01)

(56) References Cited

U.S. PATENT DOCUMENTS

| | | | |
|---|---|---|---|
| 2017/0023932 A1* | 1/2017 | Drumm | G06F 30/20 |
| 2017/0344675 A1* | 11/2017 | Lutz | G06F 9/45533 |
| 2018/0267496 A1* | 9/2018 | Wang | G05B 19/056 |
| 2018/0356800 A1 | 12/2018 | Chao et al. | |
| 2020/0249663 A1 | 8/2020 | Liu et al. | |
| 2020/0311636 A1 | 10/2020 | Grant et al. | |

FOREIGN PATENT DOCUMENTS

| | | |
|---|---|---|
| CN | 108107841 | 6/2018 |
| CN | 108628595 | 10/2018 |
| CN | 109326003 | 2/2019 |
| CN | 109343496 | 2/2019 |
| DE | 10245176 | 4/2004 |
| EP | 3082001 | 10/2016 |
| RU | 2668835 C2 | 10/2018 |
| WO | WO 2004/031874 | 4/2004 |

OTHER PUBLICATIONS

PCT International Search Report dated Aug. 3, 2020 based on PCT/EP2020/057945 filed Mar. 23, 2020.
Komrakov The Concept of a Digital Twin In Industrial Lifecycle Management, Web Scientific Journal: Scientific Idea, 7 pgs., 2017.

* cited by examiner

METHOD FOR ENGINEERING AND SIMULATING AN AUTOMATION SYSTEM VIA DIGITAL TWINS

CROSS-REFERENCE TO RELATED APPLICATIONS

This is a U.S. national stage of application No. PCT/EP2020/057945 filed 23 Mar. 2020. Priority is claimed on German Application No. 10 2019 204 480.8 filed 29 Mar. 2019, the content of which is incorporated herein by reference in its entirety.

BACKGROUND OF THE INVENTION

1. Field of the Invention

The invention relates to an automation system and a method for engineering an automation system for controlling a process in a process plant, where the automation system comprises a plurality of hardware components for performing display, operating and automation functions which are connected to one another by way of communication systems.

2. Description of the Related Art

What are known as "digital twins" are known well enough from production engineering. These refer to computer-assisted images or representatives of an object from the real world. According to the Gabler Wirtschaftslexikon (dictionary of economics), a digital twin is defined as a virtual model, e.g., of a process, a product or a service, which connects the real and virtual world. Digital twins are built using data and algorithms and use real data from installed sensors, which represent the operating conditions or position of machines, for instance. Digital twins map plants throughout the entire life cycle (design, production, operation and recycling). Engineers are able to use simulation models to optimize workflows as early as during planning. If the plant is in operation, then the same simulation models can be used to further optimize workflows and to change production.

The creation of a digital twin requires different elements. Generally, these elements are a real object to be imaged, a virtual representation space and data relating to the environmental conditions. The twins are produced using collected real time data of the real object and descriptive algorithms and mapped in a digital representation space. A modular concept is often used, in which the digital twin is composed of many individual digital twins.

Multiple applications for computer-assisted maps of real objects also arise in the context of the automation of process engineering.

When a process plant is commissioned, it is normal for the engineering of the plant to be supplemented with a simulation or emulation. Before automation programs and plant images are loaded into a real and running plant, they must be tested accordingly and possibly also corrected. For this purpose, a digital twin is generally used, i.e., the automation programs are loaded into emulated automation servers of a virtual shadow plant and tested, for example. In order to virtualize the field level, a plant simulator is used, which processes models of the field level and exchanges the process inputs and process outputs with the virtual automations. The simulation/emulation is then completely decoupled from the engineering of the automation system, which is frequently very disadvantageous: for changes and adjustments in the automation programs and plant images, it is necessary to toggle back and forth between simulation and engineering. This may easily cause inconsistencies or parameterization errors in the simulation. These can also compromise the real plant, e.g., if the IP addresses of the virtual automations used by the simulation overlap with those of the automations of the real plant when they are both in the same network.

SUMMARY OF THE INVENTION

In view of the foregoing, it is therefore an object of the invention to provide an automation system for a technical plant and a flexible method for engineering an automation system of a technical plant that allows a coexistent simulation, emulation, or virtualization of any number of components of the automation system as an integral component part of the engineering of the hardware configuration of the automation system.

This and other objects and advantages are achieved in accordance with the invention by a method and an automation system, where in connection with simulations, reference is made to the system to be simulated and to a simulator as an implementation or realization of a simulation model. The simulation model therefore represents an abstraction of the system to be simulated in terms of structure, function and behavior.

An emulator, by contrast, attempts to replicate the entire target system as authentically as possible. The replicated system obtains the same data, executes comparable programs and achieves results as similar as possible, with respect to specific questions, to the real target system. In computer science, the replication of a hardware or software object by a similar object of the same type with the aid of an abstraction layer is referred to as virtualization. This allows virtual devices to be generated, such as emulated hardware or software. One possibility of achieving a virtualization of an object is the virtual machine (VMware).

The subject matter of the invention is now to use such virtual devices, such as emulated hardware components of an automation system (e.g., emulated automations, or operator station servers) in the hardware configuration during the engineering to achieve different stages and variants of digital twins for the flexible and incremental commissioning of automation programs and plant images advantageously in parallel with the engineering of the real hardware components.

The inventive method for engineering an automation system for controlling a process in a technical plant, which comprises a plurality of hardware components for performing display, operating and automation functions, where these components are interconnected via communication systems, is characterized in that independently of the operation of the plant, in parallel with the engineering of at least one real hardware component, this component can also be generated, instantiated and logically linked in a virtualized manner as a digital twin. The virtual components generated in such a way can be configured and optimized (in any desired manner) and then loaded in parallel with the real components onto servers of the automation system, where the corresponding function is performed.

The advantages of using virtual components in engineering are diverse. In particular, a coexistent, secure, flexible and staged commissioning of automation programs and plant images is possible. Optimization in parallel with operation is supported based on the digital twin. Both the real plant and also the digital (partial) twin are always configurable and monitored by the integrated engineering.

A significant advantage of the invention consists in the method being implementable "independently of the operation of the plant". This means that the virtual components can be generated even before commissioning. At the same time, a virtualization is also possible during the commissioning (cf. FIG. 2) or even during ongoing operation. This grants the project engineer of the technical plant significant flexibility.

The virtual twin or the virtual component can be generated, for instance, by the project engineer clicking on the desired object in a device library of the engineering server. As a result, an instance is generated, which represents the current state of a hardware component. In so doing, the virtual component is also assigned its own IP address. The logical connection is then fixed. This defines the communication relationship between the respective components (here devices). If a logical connection between an automation and an operator station server is defined, then process data can also be transmitted during runtime. Before automation programs and plant images are loaded into a real and running plant, however, they can now be configured, tested and possibly also corrected in any desired manner in the virtual component. The virtual components that are optimized in such a way are subsequently loaded onto servers of the automation system and implemented in parallel with the real components. The inventive method advantageously enables a coexistence of the two forms of an object as a real component and a virtual component.

In a particularly advantageous embodiment, the virtual components can be distributed in any desired manner onto the servers of the automation system. This distribution can be configured flexibly. In hardware engineering, it is therefore possible to determine or specify which virtual devices are to be localized on which servers of the automation system. In this way, the storage capacities of the servers of the automation system can be optimally used and/or flexibly deployed.

A further significant advantage of the disclosed embodiments of the invention consists in the number of virtual components being freely selectable. This produces a scalable solution. On account of the scalability of this solution approach, a "multi user" simulation is thus also possible, because every project engineer can, in effect, configure and use a digital (partial) twin that is tailored individually to his or her test.

In a further advantageous embodiment, the logical connections between the virtual components and between the virtual and real components can be configured flexibly. As a result, any desired variants of the engineering can be realized. By defining the logical connections, it is moreover also possible to be able to configure precisely which (virtual) devices are permitted to communicate with which (virtual) devices.

During engineering, it is advantageously possible to switch between real components and virtual components to perform changes. In a particularly advantageous embodiment, the switchover can even occur in a shockproof manner. Here shockproof means that the switchover can occur even within a cycle of the automation system.

The virtual components can advantageously be managed in a database. This allows a user of the database to further change or modify another user's component, for instance. In this way, the engineering is facilitated and can possibly also be performed faster.

In a further embodiment, the allocations to the technological hierarchy are assisted for all virtual components (as also with the real components). What are known as allocations in the technological hierarchy define which plant components are automated by which devices, e.g., if a structure folder "plantsection1" is assigned to an AS1 and an OS1, then the automation programs (functional plans) created below the structure folder are automatically assigned to the AS1 and the respective plant images of the OS1 are assigned and are subsequently also loaded at this location and executed. A plant section in a structure folder can firstly only be allocated to virtual components for the staged commissioning. It is only when the function of the automation programs and plant images has been assured by the simulation that the same structure folder with the plant section can be assigned to real devices. Furthermore, the structure folder plant sections (and of course fine-granular plant sections, such as technical facilities and even measuring points) in the technological hierarchy can also be duplicated and assigned to virtual components in parallel, in order to be able to realize a digital twin (e.g., for operational optimizations) which runs in parallel with the real plant.

Automation documents such as function plans or plant images for a commissioning can advantageously be allocated to the virtual components before they are loaded onto the servers of the automation system. Virtual devices can initially only interact in parallel with virtual, subsequently also with real devices over the course of a staged commissioning. The logical connections between the devices are reconfigured for this purpose. (Example: for the commissioning of a new plant image, the virtual operator station firstly interacts with a virtual automation, for the purpose of dynamizing the plant image, in order inter alia to avoid faulty operations. In a next step, the virtual operator station then interacts with a real automation, in order to dynamize the plant image, provided for the commissioning, with real process data. In the last step, the commissioned plant image is finally allocated to a real operator station.)

A commissioning of various automation documents can advantageously occur in parallel with a number of project engineers and on different virtual components and/or on virtual components that are available multiple times. This also allows for large scalability.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and its embodiments are described and explained in more detail below on the basis of the figures, in which an exemplary embodiment of the invention is shown and, in which.

DETAILED DESCRIPTION OF THE EXEMPLARY EMBODIMENTS

Figure 1:
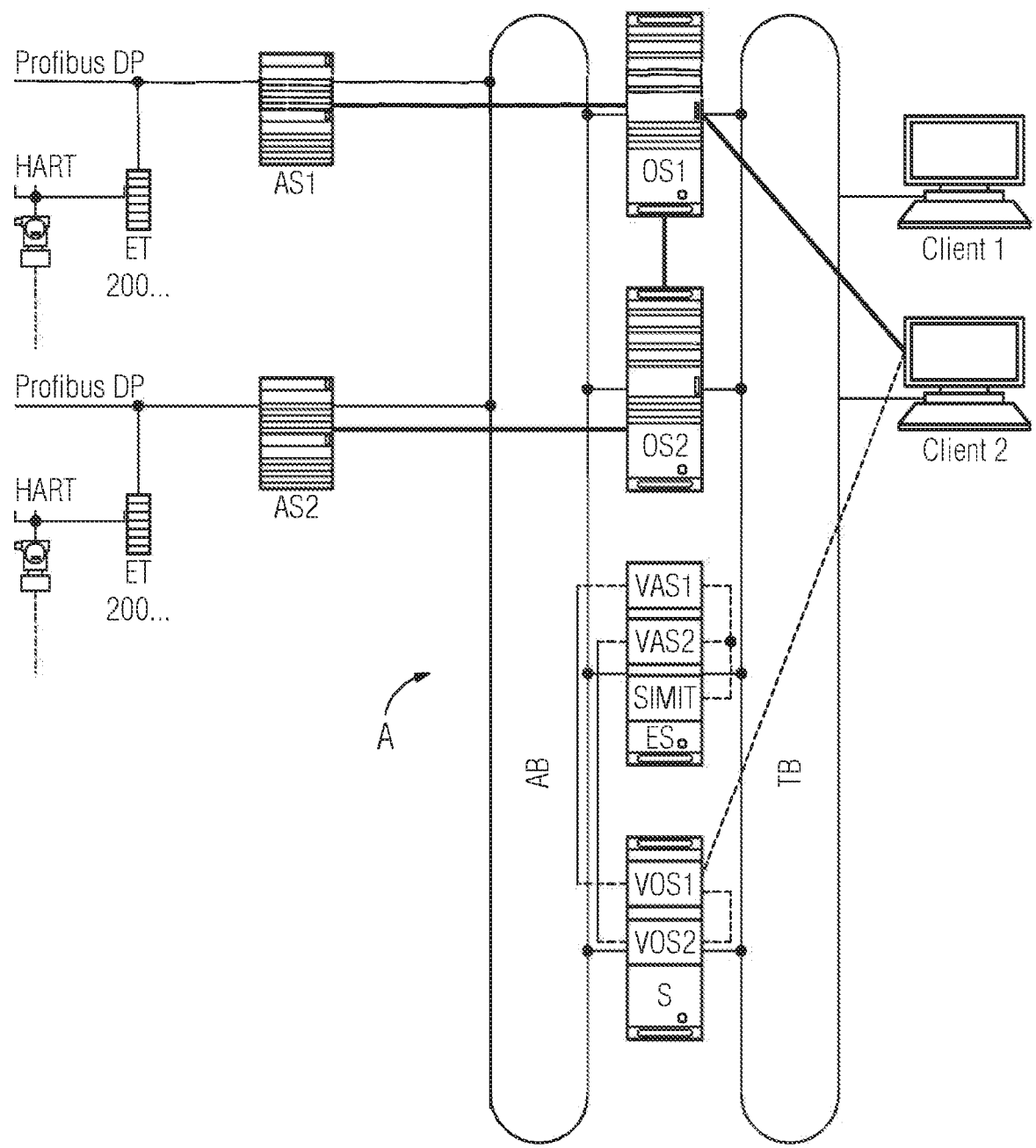
FIG. 1 shows a functional schematic diagram of an automation system for controlling a process with the software architecture indicated for implementing the inventive method in accordance with an embodiment of an optimization in parallel with operation.

FIG. 1 shows a simplified schematic representation of an example of an automation system A, via which mostly process engineering in a technical plant, e.g., a technical manufacturing, production or also power plant, is controlled, regulated and monitored. The automation system A has a plurality of process-oriented components (field devices, assemblies, I/O systems, controllers) that perform specific measurement, control and regulation functions on the field level, i.e., in the process. The field devices exchange process-, function- and/or device-relevant data with one another via a communication system (here Profibus TB), and with the higher control and command levels. The communication system of the field level is connected with a plurality of automation devices AS such as programmable logic controllers (PLCs). The automation devices AS1, AS2 are in turn connected with a higher-level computer system via a further communication system, the plant bus AB, which is in most cases formed as an Industrial Ethernet. In the present exemplary embodiment, this comprises an operating and monitoring system, which consists of a number of operator station servers OS (abbreviated to OS servers, OS1, OS2 . . . ) and at least one client computer. The OS client OSC exchanges information and data with the OS servers via a further bus system TB, which is referred to here as a terminal bus TB. Furthermore, the automation system can comprise even more servers. The automation system shown in FIG. 1 is configured such that it has a further component, an engineering workstation ES. This is a computer or server, which is connected to the communication systems AB and TB for data transmission purposes and can likewise access the communication systems AB and TB via a client of the operating and monitoring system. If necessary, even more computers or servers S can be connected to the communication systems AB and TB.

FIG. 1 also shows in simplified form, besides parts of the hardware configuration of the automation system just described, parts of the software architecture for implementing the inventive method.

In accordance with the invention, virtual components of the real afore-described hardware configuration are shown in the engineering server ES, embodied as software modules or software components.

FIG. 1 shows by way of example a functional diagram of a coexistent digital twin for an optimization in parallel with operation. Virtual counterparts, the virtual components (VOS1, VOS2, VAS1, VAS2), exist for each of the real devices (operator station servers OS1, OS2, automation devices AS1, AS2 . . . ). The logical connections between the real components are symbolized with thick black lines. The logical connections between the virtual components are symbolized by dashed lines. On account of the logical connections, a client can switch flexibly between the real plant and the digital twin. Both the real plant and also the digital twin are configured and monitored by the integrated engineering. The field level is virtualized by the plant simulator SIMIT.

By applying the inventive measures, it is now possible to co-existently plan virtual automations and operator station servers in the engineering, such that it is possible to switch between real and virtual plant sections during runtime in an operator station client. If an operator wishes to optimize a setting of a controller, he or she can test this in parallel with operation on a virtual plant section before playing this into the real plant section.

Figure 2:
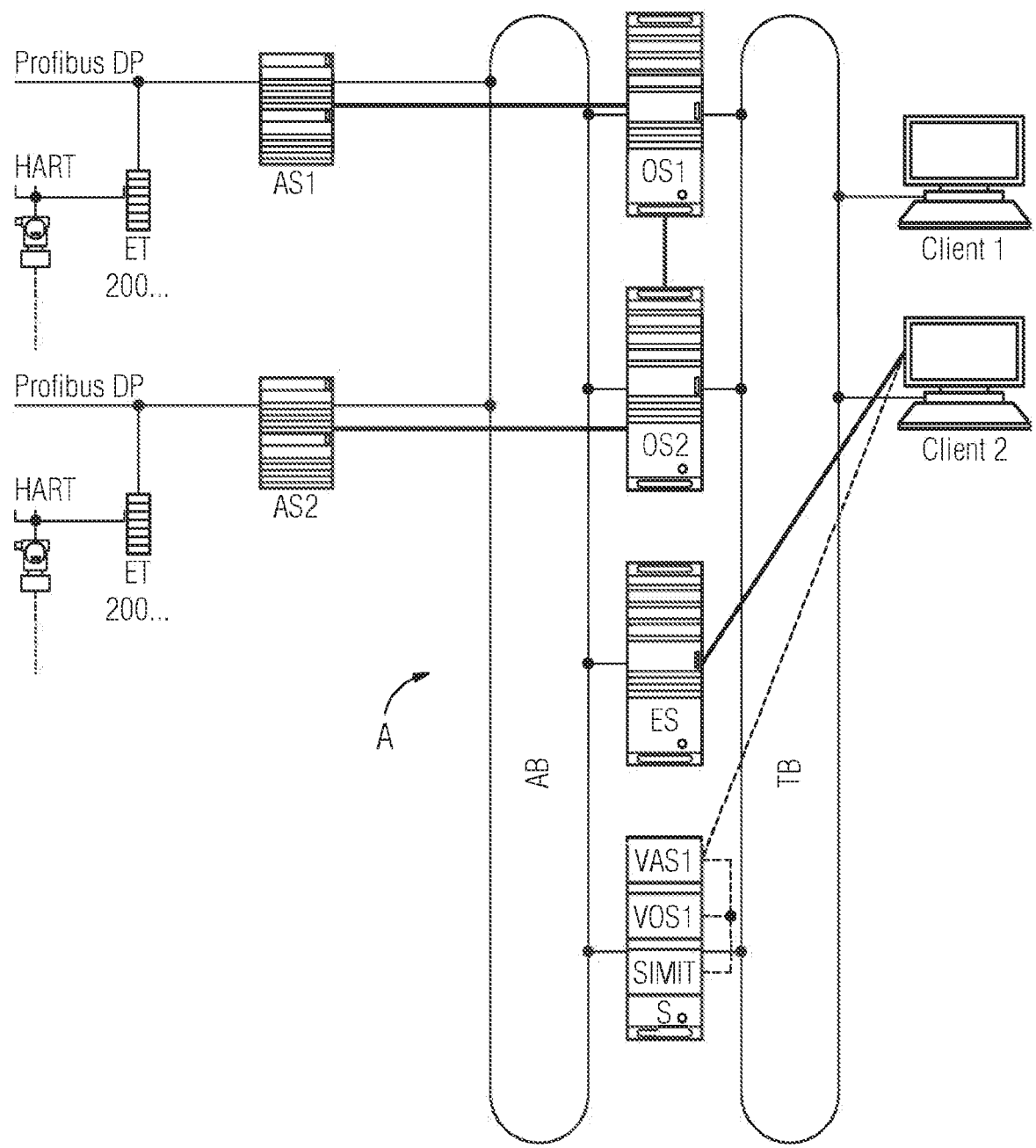
FIG. 2 shows a further functional diagram of an automation system for controlling a process with the software architecture indicated for implementing the inventive method in accordance with an embodiment of a staged commissioning.

FIG. 2 shows by way of example a functional diagram of a coexistent digital twin for a staged commissioning. In this exemplary embodiment, virtual counterparts (VOS1 and VAS1) exist for each of several real components (operator station server OS1 and the automation device AS1) on the server S with the plant simulator SIMIT for virtualizing the field level. The virtual components VAS1, VOS1 and SIMIT are interlinked via the logical connection (shown with a dashed line) and with the client computer. The client can switch flexibly between a digital (partial) twin and the engineering of the real components in the engineering server ES. Access by the client computer to the engineering server is symbolized with a thick black line. During engineering, the project engineer can observe (debug), correct and also reload the automation program executed in the VAS1 on the client, for instance. The plant images can be visualized and tested in VOS1 in parallel. If error corrections are required, then these can also be performed and reloaded at the same time in engineering. If the commissioning is complete, then the automation programs and plant images from the virtual components can, as described previously, be allocated to the real devices and loaded. Both the real plant as well as the digital (partial) twin are configured and monitored by the integrated engineering in accordance with the invention.

Figure 3:
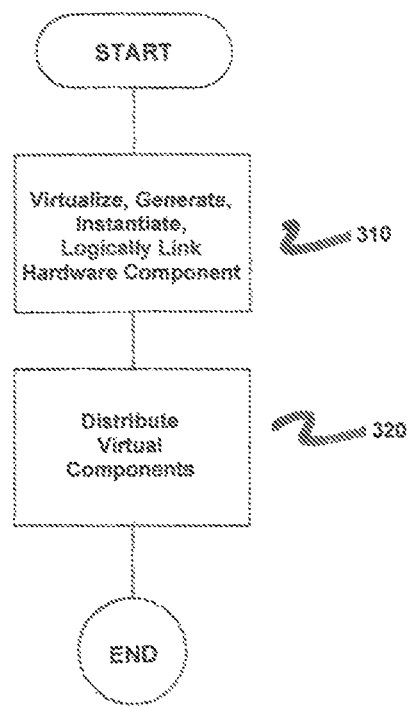
FIG. 3 is a flowchart of the method in accordance with the invention.

FIG. 3 is flowchart of the method for engineering an automation system A for controlling a process in a technical plant, where the automation system A comprises a plurality of hardware components OS1, OS2, AS1, AS2, . . . for performing display, operating and automation functions, and where the plurality of hardware components OS1, OS2, AS1, AS2, . . . are interconnected via communication systems. The method comprises virtualizing, generating as a coexistent digital twin, instantiating and logically linking, in parallel with engineering of at least one real hardware component, said at least one real hardware component with other virtual or real components, as indicated in step 310.

Next, generated virtual components VOS1, VOS2, VAS1, VAS2, . . . are distributed in any desired manner onto servers ES, S of the automation system A such the generated virtual components VOS1, VOS2, VAS1, VAS2, . . . are configured, optimized and monitored by at least one client and such that, during engineering, switching between real components and virtual components to perform changes becomes possible, as indicated in step 320.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for engineering an automation system for controlling a process in a technical plant, the automation system comprising a plurality of hardware components for performing display, operating and automation functions, said plurality of hardware components being interconnected via communication systems, the method comprising:

virtualizing, generating a digital twin which coexists with at least one real hardware component, instantiating and logically connecting said at least one real hardware component with other virtual or real components, said virtualizing, generating the digital twin which coexists with said at least one real hardware component, instantiating and logically connecting occurring in parallel with engineering of the at least one real hardware component which occurs independently of operation of the technical plant; and distributing generated virtual components arbitrarily onto servers of the automation system such that the generated virtual components are configured, optimized and monitored by at least one client and such that, during the engineering of the at least one real hardware component occurring independently of the operation of the technical plant, switching between real components and virtual components to perform changes becomes possible.

2. The method as claimed in claim 1, wherein the switchover occurs with a cycle of the automation system.

3. The method as claimed in claim 2, wherein distribution of the virtual components onto the servers of the automation system is configurable.

4. The method as claimed in claim 2, wherein a number of virtual components is freely selectable.

5. The method as claimed in claim 1, wherein distribution of the virtual components onto the servers of the automation system is configurable.

6. The method as claimed in claim 5, wherein a number of virtual components is freely selectable.

7. The method as claimed in claim 1, wherein a number of virtual components is freely selectable.

8. The method as claimed in claim 1, wherein logical connections for communication between the virtual components and additionally between virtual and the real components are configurable.

9. The method as claimed in claim 1, wherein the virtual components are managed in a database.

10. The method as claimed in claim 1, wherein the virtual components are allocated to a technological hierarchy such that a definition of which plant components are automated by which device is established.

11. The method as claimed in claim 1, wherein functional plans or plant images for a commissioning are allocated to the virtual components before said virtual components are loaded onto the servers of the automation system in parallel with real components.

12. An automation system for controlling a process in a technical plant, the automation system comprising:

a plurality of hardware components for performing display and operating functions and automation functions, said plurality of hardware components being interconnected via communication systems, an engineering server for configuring each of the plurality of hardware components; and at least one further server;

wherein the servers are configured to:

virtualize, generate a digital twin which coexists with at least one real hardware component, instantiate and logically connect said at least one real hardware component with other virtual or real components, said virtualization, generation of the digital twin which coexists with said at least one real hardware component, instantiation and logical connection occurring in parallel with engineering of the at least one real hardware component which occurs independently of operation of the technical plant; and distribute generated virtual components arbitrarily onto servers of the automation system such that the generated virtual components are configured, optimized and monitored by at least one client and such that, during the engineering of the at least one real hardware component occurring independently of the operation of the technical plant, switching between real components and virtual components to perform changes becomes possible.

* * * * *